US008695490B2

(12) United States Patent
Harris et al.

(10) Patent No.: US 8,695,490 B2
(45) Date of Patent: Apr. 15, 2014

(54) DRIVE SYSTEM

(75) Inventors: E. Mark Harris, McHenry, IL (US); Markus Klotz, Hainau (DE)

(73) Assignee: Columbia Insurance Company, Omaha, NE (US)

( * ) Notice: Subject to any disclaimer, the term of this patent is extended or adjusted under 35 U.S.C. 154(b) by 334 days.

(21) Appl. No.: 13/075,708

(22) Filed: Mar. 30, 2011

(65) Prior Publication Data

US 2011/0239874 A1    Oct. 6, 2011

(51) Int. Cl.
*A23N 4/04* (2006.01)

(52) U.S. Cl.
USPC ............... 99/537; 74/125.5; 74/435; 74/437; 74/462; 74/468

(58) Field of Classification Search
CPC ............ A47J 43/1031; F16H 19/001; F16H 2035/003
USPC ............ 99/537; 74/125.5, 435, 437, 462, 468
See application file for complete search history.

(56) References Cited

U.S. PATENT DOCUMENTS

| 20,830 | A | * | 7/1858 | Taylor | 99/600 |
|---|---|---|---|---|---|
| 1,517,519 | A | | 12/1924 | Stillians | |
| 2,143,236 | A | * | 1/1939 | Birk | 74/435 |
| 2,178,889 | A | | 11/1939 | Gabrieau | |
| 2,507,681 | A | | 5/1950 | Sage | |
| 2,523,165 | A | | 9/1950 | Tice | |
| 2,552,572 | A | * | 5/1951 | Mikina | 99/503 |
| 2,664,127 | A | * | 12/1953 | Perrelli | 99/551 |
| 3,154,123 | A | | 10/1964 | Tomlinson | |
| 3,825,249 | A | * | 7/1974 | Zimmer | 271/109 |
| 3,869,935 | A | * | 3/1975 | Mathieu | 74/322 |
| 3,952,607 | A | * | 4/1976 | Ring | 74/393 |
| 3,957,215 | A | | 5/1976 | Otto et al. | |
| 3,992,960 | A | * | 11/1976 | Rulseh | 74/393 |
| 4,125,033 | A | * | 11/1978 | Riedl | 74/125.5 |
| 4,231,405 | A | * | 11/1980 | Vila | 144/28.4 |
| 4,233,774 | A | | 11/1980 | Sahar | |

(Continued)

FOREIGN PATENT DOCUMENTS

| DE | 580073 A1 | 7/1933 |
|---|---|---|
| DE | 10 2010 016 322.8-16 | 4/2010 |

(Continued)

OTHER PUBLICATIONS

European Search Report from Application No. EP 07 25 0871 (Patent No. EP 1 964 499 A1), along with Patent. No. EP 1 964 499 A1p.

(Continued)

*Primary Examiner* — Henry Yuen
*Assistant Examiner* — Brett Spurlock
(74) *Attorney, Agent, or Firm* — Neal, Gerber & Eisenberg, LLP

(57) ABSTRACT

A drive unit that is movable between an unfired and a fired position. The drive unit comprises a handle member, a first drive gear having a first axis of rotation, and a second drive gear, engaged to the first drive gear at a mesh point, and having a second axis of rotation. The mesh point moves with respect to the axes of rotation as the handle member moves from the unfired position to the fired position. The drive unit drives an implement only when it is moved from the unfired position to the fired position.

24 Claims, 8 Drawing Sheets

(56) References Cited

U.S. PATENT DOCUMENTS

| | | | |
|---|---|---|---|
| 4,282,779 A * | 8/1981 | Kato | 74/822 |
| 4,352,299 A * | 10/1982 | Riggs et al. | 74/84 R |
| 4,543,839 A * | 10/1985 | Buchanan et al. | 74/98 |
| 4,643,692 A | 2/1987 | Magers | |
| 4,756,203 A * | 7/1988 | Matsuda | 74/84 R |
| 4,763,567 A | 8/1988 | Dalquist, III et al. | |
| 4,765,195 A * | 8/1988 | Takami | 74/113 |
| 4,889,013 A * | 12/1989 | Pitassi et al. | 475/255 |
| 4,907,474 A * | 3/1990 | Bolger | 475/14 |
| 4,967,970 A | 11/1990 | Michel | |
| 5,064,535 A | 11/1991 | Hsu | |
| 5,156,084 A | 10/1992 | Lin | |
| D331,170 S | 11/1992 | Greiner | |
| 5,161,508 A * | 11/1992 | Zentgraf et al. | 123/339.25 |
| 5,184,544 A | 2/1993 | Ling | |
| 5,199,788 A | 4/1993 | Stallings | |
| D361,694 S | 8/1995 | Wong | |
| 5,562,025 A | 10/1996 | Bull | |
| D376,063 S | 12/1996 | Bull et al. | |
| 5,632,450 A * | 5/1997 | Moor | 241/100 |
| 5,735,193 A | 4/1998 | Chang | |
| D395,194 S | 6/1998 | Wong | |
| 5,765,947 A | 6/1998 | Dubroy | |
| D402,165 S | 12/1998 | Bull | |
| 5,934,179 A | 8/1999 | Schmid et al. | |
| D413,761 S | 9/1999 | Conran et al. | |
| 5,960,709 A | 10/1999 | Yip | |
| D415,938 S | 11/1999 | Blaise | |
| 6,018,883 A | 2/2000 | Mulhauser | |
| 6,035,771 A | 3/2000 | Conran et al. | |
| D426,743 S | 6/2000 | Wong | |
| D426,744 S | 6/2000 | Wong | |
| D427,011 S | 6/2000 | Yip | |
| D430,775 S | 9/2000 | Wong | |
| D433,594 S | 11/2000 | Wong | |
| D433,871 S | 11/2000 | Wong | |
| D434,597 S | 12/2000 | Yip | |
| D447,017 S | 8/2001 | Jalet | |
| 6,302,014 B1 | 10/2001 | Kuan | |
| 6,467,711 B2 | 10/2002 | Michel | |
| 6,510,785 B1 | 1/2003 | Margolin | |
| 6,609,455 B2 | 8/2003 | Fouquet | |
| 6,626,055 B2 * | 9/2003 | Magaribuchi | 74/89.17 |
| D480,613 S | 10/2003 | Wong | |
| D481,271 S | 10/2003 | Herren | |
| 6,634,580 B2 | 10/2003 | Obersteiner | |
| 6,676,051 B2 | 1/2004 | Rebordosa et al. | |
| 6,709,256 B2 * | 3/2004 | Tashiro et al. | 425/142 |
| 6,718,838 B2 * | 4/2004 | Joyce et al. | 74/107 |
| 6,722,222 B1 | 4/2004 | Dolan et al. | |
| 7,059,553 B2 | 6/2006 | Mueller | |
| 7,100,854 B2 | 9/2006 | Aby-Eva et al. | |
| 7,146,896 B2 | 12/2006 | Chang | |
| 7,152,821 B2 | 12/2006 | Aby-Eva et al. | |
| D538,605 S | 3/2007 | Wan | |
| D538,606 S | 3/2007 | Hood | |
| 7,258,292 B2 * | 8/2007 | Cheung | 241/169 |
| 7,311,280 B2 | 12/2007 | Herren | |
| 7,422,169 B2 | 9/2008 | Mueller | |
| 7,581,463 B2 * | 9/2009 | Jacobs et al. | 74/406 |
| 7,621,213 B2 | 11/2009 | Wong | |
| 7,669,793 B2 | 3/2010 | So et al. | |
| 7,677,124 B2 * | 3/2010 | Honma | 74/337.5 |
| 7,681,495 B2 | 3/2010 | Wan et al. | |
| 7,975,605 B2 | 7/2011 | Wan et al. | |
| 7,975,947 B2 * | 7/2011 | Horstmann | 241/169 |
| 8,402,886 B2 * | 3/2013 | Herren | 99/510 |
| 2001/0003925 A1 * | 6/2001 | Swan | 74/425 |
| 2004/0182958 A1 | 9/2004 | Herren | |
| 2005/0061898 A1 | 3/2005 | Whitmer | |
| 2005/0217405 A1 * | 10/2005 | Suzuki | 74/473.12 |
| 2006/0021457 A1 * | 2/2006 | Jacobs et al. | 74/352 |
| 2008/0067029 A1 * | 3/2008 | Garrick et al. | 192/215 |
| 2008/0163768 A1 * | 7/2008 | Glucksman et al. | 99/537 |
| 2008/0210103 A1 | 9/2008 | Wan et al. | |
| 2008/0223226 A1 | 9/2008 | Holcomb et al. | |
| 2008/0277513 A1 | 11/2008 | Holcomb et al. | |
| 2009/0045274 A1 | 2/2009 | So et al. | |
| 2009/0090254 A1 | 4/2009 | Herren | |
| 2009/0114104 A1 | 5/2009 | Sawhney et al. | |
| 2009/0160275 A1 * | 6/2009 | Keefover et al. | 310/83 |
| 2009/0178580 A1 | 7/2009 | Herren | |
| 2009/0236453 A1 | 9/2009 | Heng et al. | |

FOREIGN PATENT DOCUMENTS

| | | |
|---|---|---|
| DE | 10 2010 017 099.2-16 | 5/2010 |
| EP | 0345223 B1 | 11/1994 |
| EP | 1253997 B1 | 7/2003 |
| EP | 1964499 A1 | 9/2008 |
| FR | 2532540 A1 | 9/1984 |
| GB | 1 481 283 A | 7/1977 |
| JP | 2008-220945 | 9/2008 |
| WO | WO 01/58652 A1 | 8/2001 |
| WO | WO 02/09565 A1 | 2/2002 |
| WO | WO 2004/063647 A1 | 7/2004 |
| WO | WO 2004/073474 A1 | 9/2004 |
| WO | WO 2007/128153 A1 | 11/2007 |
| WO | WO 2007/128154 A1 | 11/2007 |
| WO | WO 2007/128155 A1 | 11/2007 |

OTHER PUBLICATIONS

International Search Report for App. No. PCT/US2011/030522, dated Dec. 20, 2011.

International Search Report for App. No. PCT/US2011/037914, dated Feb. 20, 2012.

* cited by examiner

DRIVE SYSTEM

CROSS-REFERENCE

This application claims priority from German Patent Application Serial No. 10 2010 016 322.8-16, filed on Apr. 1, 2010, and German Patent Application Serial No. 10 2010 017 099.2, filed on May 26, 2010, the contents of which are incorporated herein by reference.

BACKGROUND OF THE INVENTION

This invention relates to a driving unit to transmit force from one object to another.

SUMMARY OF THE INVENTION

A driving unit is described herein. A better understanding of the invention will be obtained from the following detailed descriptions and accompanying drawings, which set forth one or more illustrative embodiments that are indicative of the various ways in which the principals of the invention may be employed.

DETAILED DESCRIPTION OF THE DRAWINGS

Figure 1:
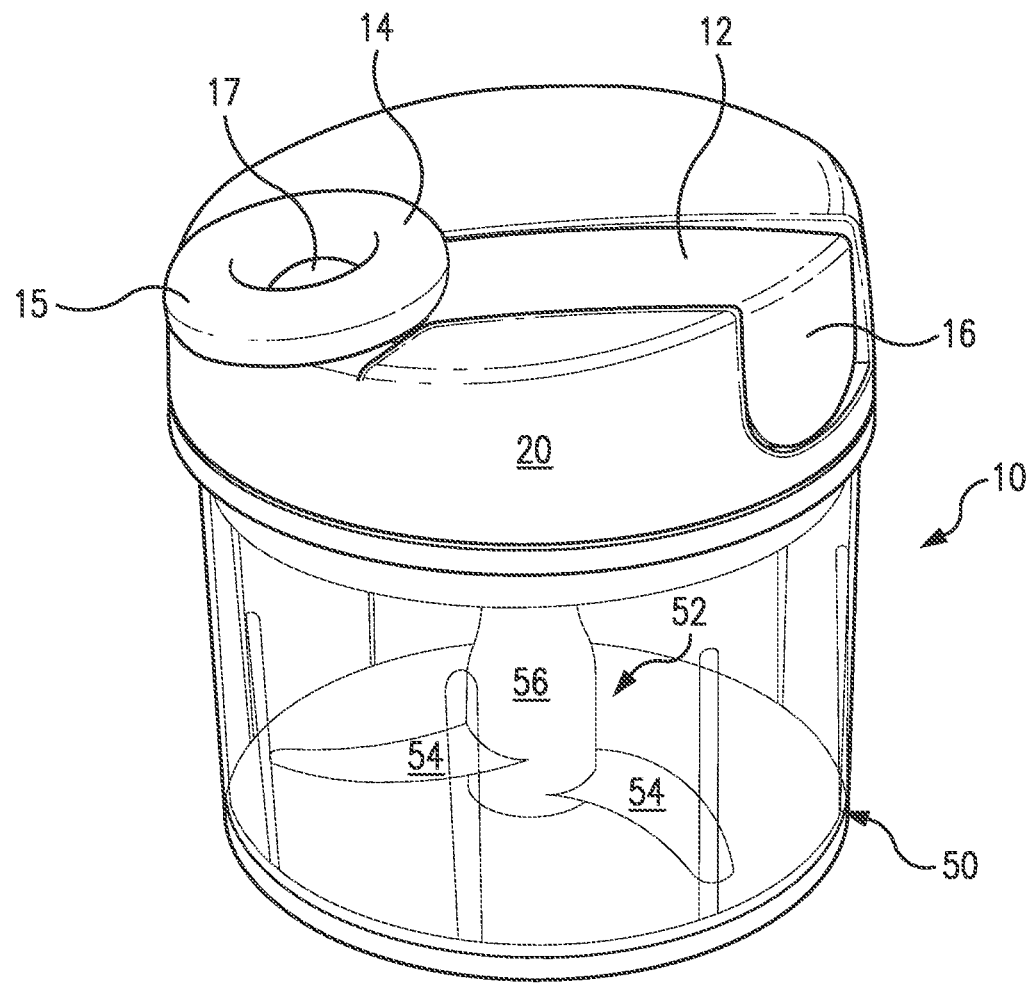
FIG. 1 is a perspective view of a first embodiment of a kitchen utensil as described herein.

The description that follows describes, illustrates and exemplifies one or more particular embodiments of the present invention in accordance with its principles. This description is not provided to limit the invention to the embodiments described herein, but rather to explain and teach the principles of the invention in such a way to enable one of ordinary skill in the art to understand these principles and, with that understanding, be able to apply them to practice not only the embodiments described herein, but also other embodiments that may come to mind in accordance with these principles. The scope of the present invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the present specification is intended to be taken as a whole and interpreted in accordance with the principles of the present invention as taught herein and understood by one of ordinary skill in the art.

The present invention is described herein with respect to a drive unit that is used to transmit force from one object to another. It may be used, for example, with an exemplary kitchen utensil 10, which is shown in FIG. 1. It will be understood that the drive mechanism disclosed herein may be used in other applications.

In the depicted embodiment, kitchen utensil 10 comprises handle member 12, which comprises first end 14 having a gripping portion 15, and second end 16 that is engaged to lid 20. In order to provide for the placement of the user's hand on the lid in order to stabilize kitchen utensil 10, in the depicted embodiments, handle member 12 is offset from the axis of rotation of implement 52.

As depicted in FIG. 1, handle member 12 is rotatably engaged to lid 20 by means of a pair of shafts 24, to move between an "up position" (not shown) and a "down" position, shown, e.g., in FIG. 1. The scope of the present invention includes embodiments with different means of engagement. For example, handle member 12 may slide laterally along lid 20 to motivate drive train 30. Handle lock 17 is disposed on lid 20 proximate to gripping portion 15. Handle lock 17 is movable between a first position, in which handle member 12 is prevented from moving with respect to lid 20, and a second position, in which handle member 12 is permitted to move with respect to lid 20. By way of additional example, the means of engagement may not be a handle member, but may also comprise a pull cord, a button, a crank, or any other means of engagement.

The depicted food processor embodiment includes base 21 (or drive train 30) engaged to container 50. Disposed within container 50 to act on food (not shown) that is placed in container 50 is processing implement 52, which is propelled by handle member 12 as described in detail below. Processing implement 52 may comprise a plurality of blades 54 disposed about central pillar 56 in order to slice or chop the food. Other processing implements may employed in a food processing device, such as a basket, whisk, etc. In other applications, a different rotated element will be used in place of processing implement 52.

Figure 2:
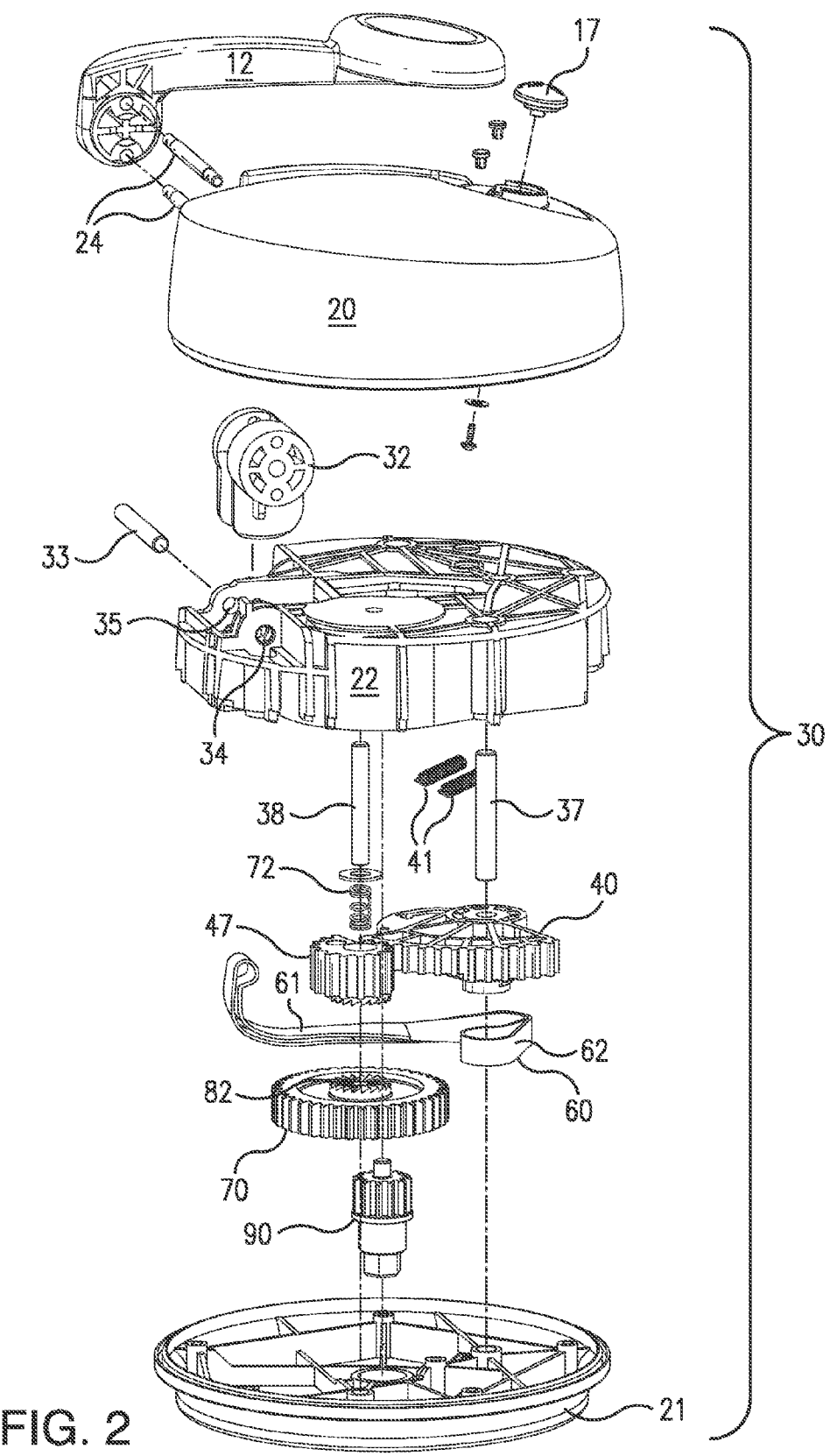
FIG. 2 is an exploded view of an embodiment of a drive train for the kitchen utensil of FIG. 1.

FIG. 2 depicts drive train 30 of kitchen utensil 10. Lobe 32 is rotatably engaged to frame 22, and is driven by handle member 12. In the depicted embodiment, lobe 32 is disposed on axle 33, which is disposed in holes 34 and 35 formed in frame 22. A pair of shafts 24 engage both handle member 12 and lobe 32 and transfer rotation from handle member 12 to lobe 32.

Various components are disposed in a cavity formed between frame 22 and base 21. Flexible link 60 comprises first end 61 engaged to lobe 32 and second end 62. In the depicted embodiment, flexible link 60 is a single piece of fabric double over itself in order to form a loop at each end 61 and 62. However, it will be appreciated by those in the art that the scope of the invention includes any flexible link. Flexible link 60 is engaged to lobe 32 proximate to first end 61. In this manner, rotation of handle member 12 causes linear movement of flexible link 60, as depicted, for example, by arrows 63 and 64 in FIG. 9.

Figure 7:
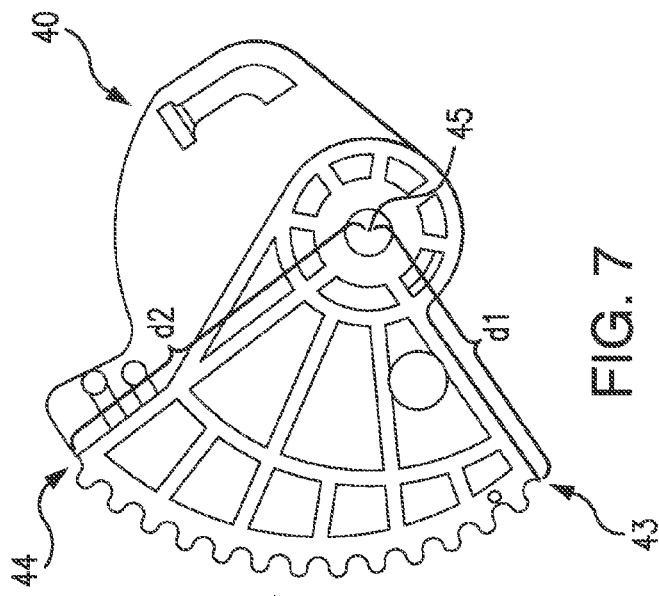
FIG. 7 is a top plan view of the quarter pinion of FIG. 6.

A stepless gear mechanism drives pinion gear 90 with a torque that is initially high and gradually moves to low as handle member 12 moves from the un-fired position to the fired position, while driving pinion gear 90 with low speed and gradually moving to high speed as handle member is moved from the un-fired position to the fired position. In the first embodiment, quarter pinion 40 is likewise disposed within the cavity, and rotates about shaft 37. In the depicted embodiment, quarter pinion 40 will only rotate about 90 degrees when handle member 12 is cycled from its up position to its down position. As such, the beginning of the rotation cycle for quarter pinion corresponds to the up position of handle member 12, while the end of the rotation cycle corresponds to the down position. As seen in detail in FIGS. 2, 6 and 7, quarter pinion 40 comprises arcuate gear form 42 and rotates about axis of rotation 45. Arcuate gear form 42 has a first end 43 located a distance d1 from axis of rotation 45, and a second end 44 located a distance d2 from axis of rotation 45, wherein d1 is less than d2. In this manner, the torque required to rotate quarter pinion 40 is greater at the beginning of the rotation cycle than at the end of the rotation cycle.

Figure 6:
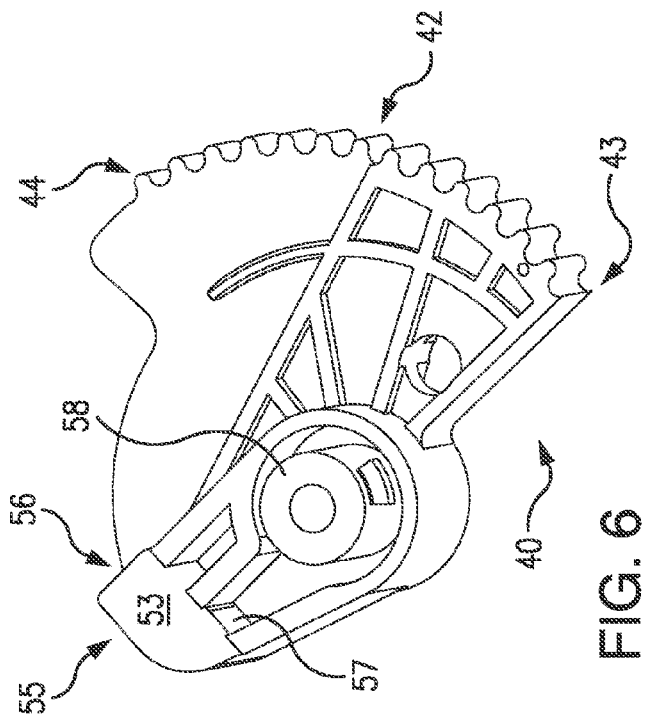
FIG. 6 is a perspective view of an embodiment of a quarter pinion gear of the drive train of FIG. 2.

As seen in detail in FIG. 6, quarter pinion 40 further comprises structure 55 formed on a first side thereof to engage flexible link 60. As depicted, second end 62 of flexible link 60 is formed into a loop, which is disposed in internal section 53 of structure 55 and wraps around anchor 58, and a portion of flexible link 60 passes through entrance 56 and exit 57. As seen, entrance 56 and exit 57 are perpendicular to one another. As a result, lateral movement of flexible link 60 results in rotation of quarter pinion 40.

Springs 41(a) and (b) are engaged to frame 22 and quarter pinion 40, and biase quarter pinion 40 to the beginning of its rotation cycle, as described above. Springs 41(a) and (b) may be replaced by one spring 41, but a single spring must be of sufficient strength to overcome the strength of spring 72. Spring 72 applies appropriate force to engage engagement means 81 and 82, allowing for rotational re-set of handle member 12, as described in detail below.

Figure 4:
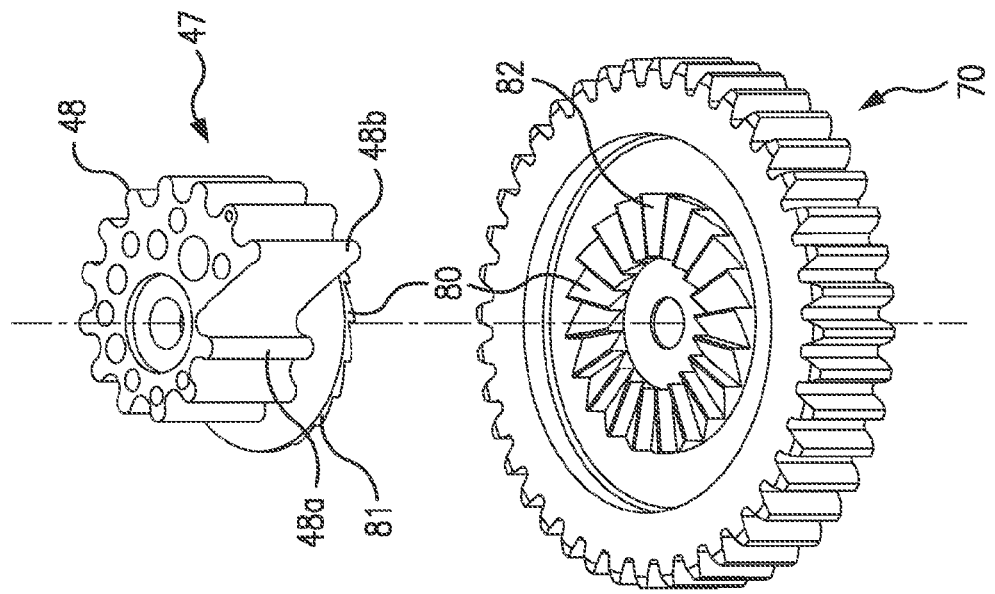
FIG. 4 is an exploded close up of an embodiment of a spiral radius gear and a spur gear of the drive train of FIG. 2, with the spiral gear on top.

A first embodiment of the present invention is depicted in FIG. 4. As seen, quarter pinion 40 is drivingly engaged to spiral radius gear 47, which rotates about shaft 38. As seen in detail in, for example, FIG. 4, spiral radius gear 47 comprises gear form 48 formed on the periphery thereof. The radius of the gear form 48 constantly increases, and causes gear form 48 to appear as a spiral. For example, tooth 48a is closer to the axis of rotation of spiral radius gear 47 than is tooth 48b. In this manner, the torque required to move spiral radius gear 47 gradually decreases through the rotation cycle. Additionally, the small radius of spiral radius gear 47 correspond to, and engage with, the large distance of quarter pinion 40, while the large radius of spiral radius gear 47 correspond to, and engage with, the small distance of quarter pinion 40. By way of example, tooth 48a engages quarter pinion 40 proximate to second end 44, while tooth 48b engages quarter pinion 40 proximate to first end 43.

Figure 3:
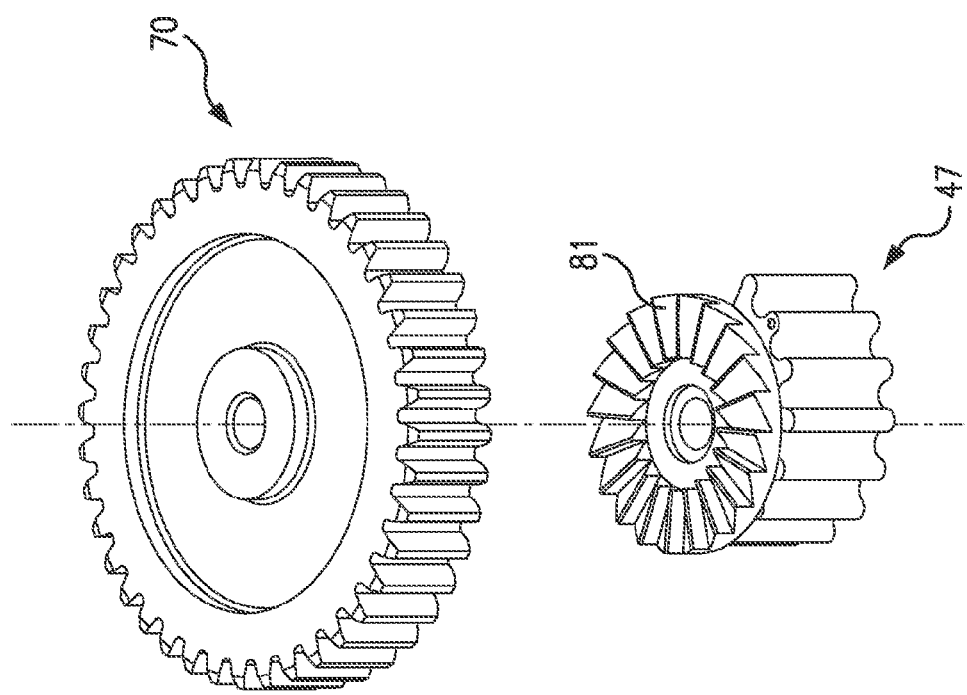
FIG. 3 is an exploded close up of an embodiment of a spiral radius gear and a spur gear of the drive train of FIG. 2, with the spur gear on top.

Spiral radius gear 47 is drivingly disposed on spur gear 70, which also rotates about shaft 38. Spiral radius gear 47 drives spur gear 70 through engagement means 80, which allows spiral radius gear 47 to transmit rotation to spur gear 70 only when rotated in one direction. As seen in FIGS. 3 and 4, a first engagement means 81 is formed on spiral radius gear 47, while a corresponding second engagement means 82 is formed on spur gear 70. In the depicted embodiment, both engagement means 81 and 82 comprise a series of ramps, ending in a near-vertical side, or even a negative angle with respect to vertical. When spiral radius gear 47 is rotated in a first direction (i.e., clockwise in FIG. 4), the vertical sides of engagement means 81 and 82 engage each other, and rotation is transferred from spiral radius gear 47 to spur gear 70. When spiral radius gear 47 is rotated in a second direction, opposite the first direction (i.e., counter-clockwise in FIG. 4), the ramps of engagement means 81 and 82 engage and slide over each other. In this direction, spiral radius gear 47 is rotated, but no rotation is transferred to spur gear 70. Spring 72 is disposed about shaft 38 and engaged to spiral radius gear 47, biasing spiral radius gear 47 into engagement with spur gear 70.

Figure 5:
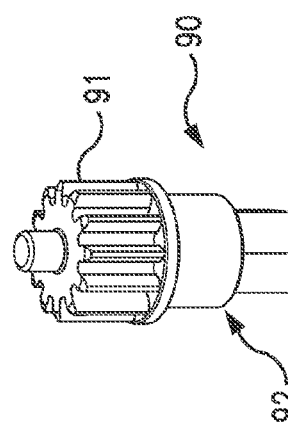
FIG. 5 is an embodiment of a pinion gear of the drive train of FIG. 2.
Figure 8:
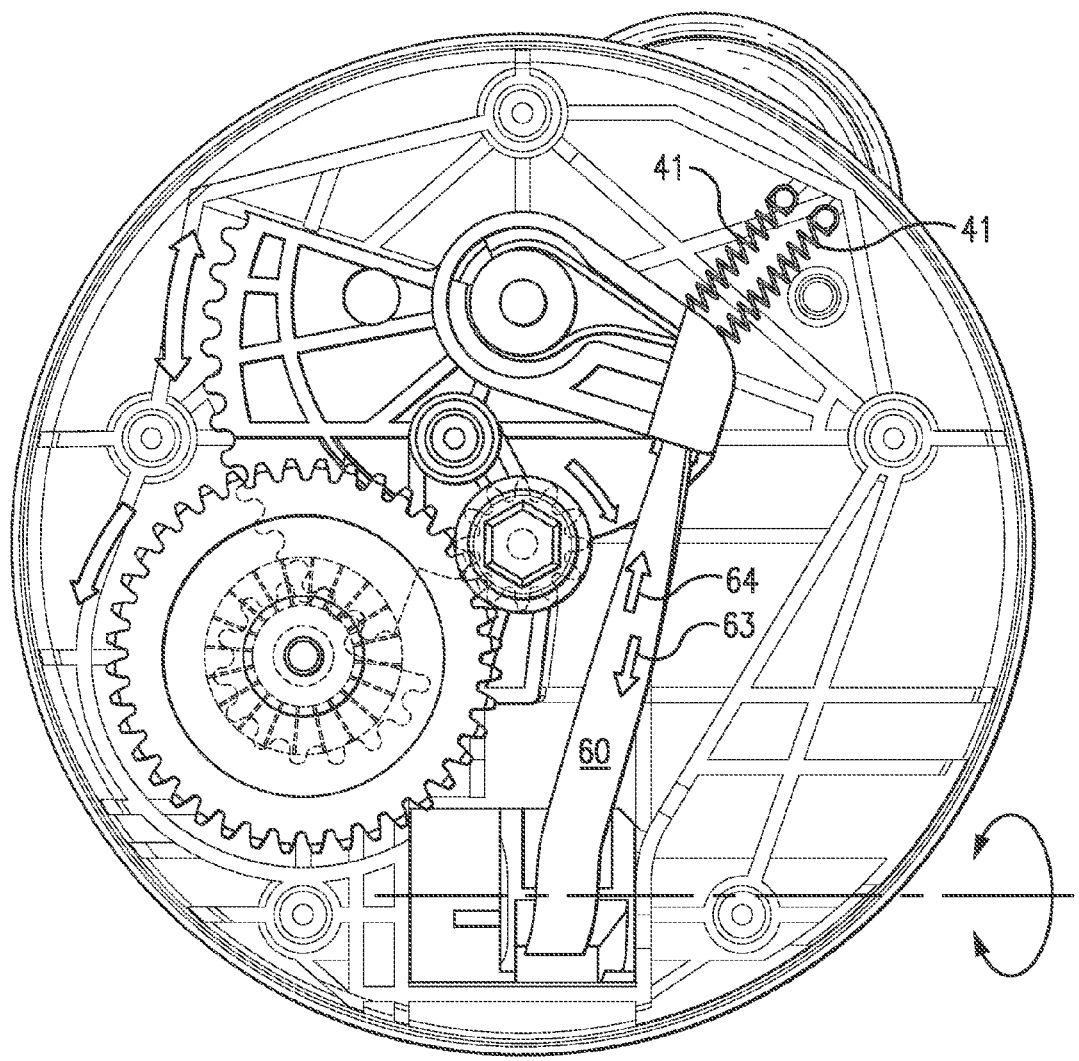
FIG. 8 is a bottom view of the assembled drive train of FIG. 2, with the drive train at the end of the cycle.

Spur gear 70 is engaged to pinion 90. As depicted in detail in, for example, FIG. 5, pinion 90 comprises gear form 91 and extension 92, which extends from gear form 91, through base 21 into container 50. Processing implement 52 engages pinion 90 through extension 92.

Figure 11:
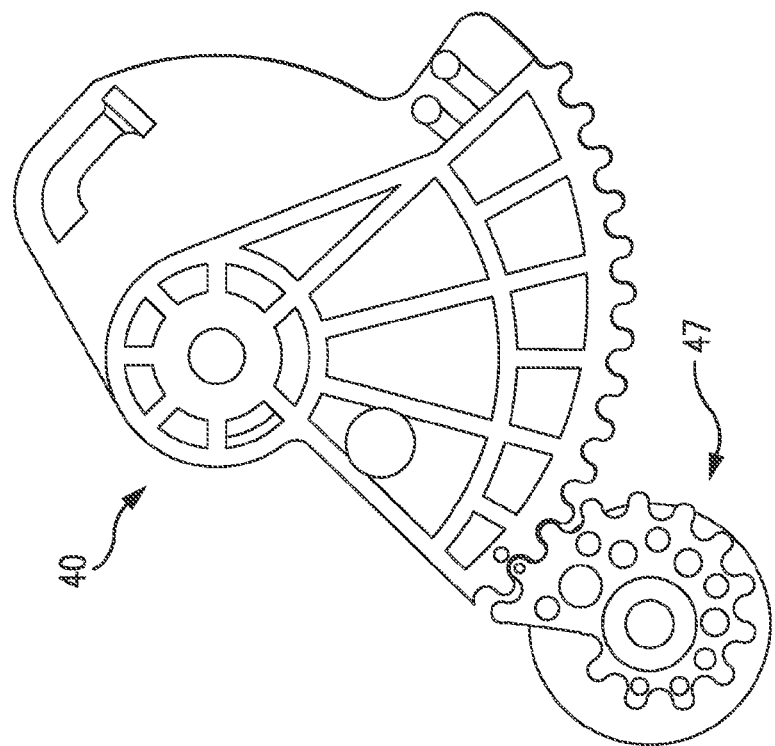
FIG. 11 is a top view of the embodiment disclosed in FIG. 10 in the un-fired position, showing just the spiral radius gear and the quarter pinion gear for clarity.
Figure 10:
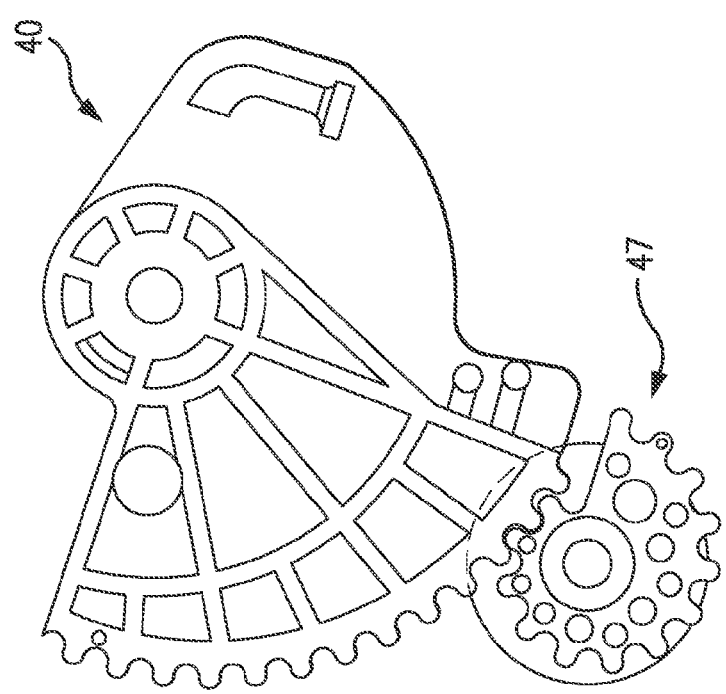
FIG. 10 is a top view of the embodiment disclosed in FIG. 2 in the fired position, showing just the spiral radius gear and the quarter pinion gear for clarity.
Figure 13:
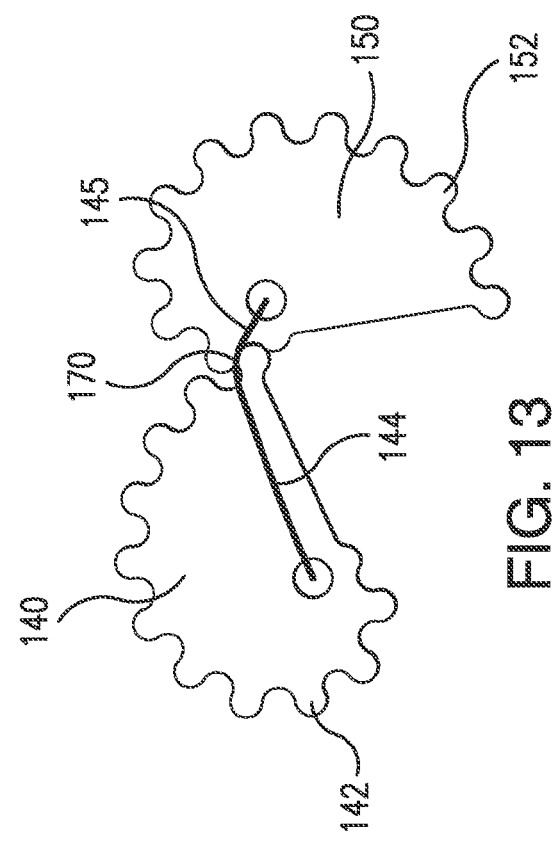
FIG. 13 is a top view of embodiment of the drive train disclosed in FIG. 12 in the un-fired position, showing just the first quarter pinion gear and the second quarter pinion gear for clarity.
Figure 12:
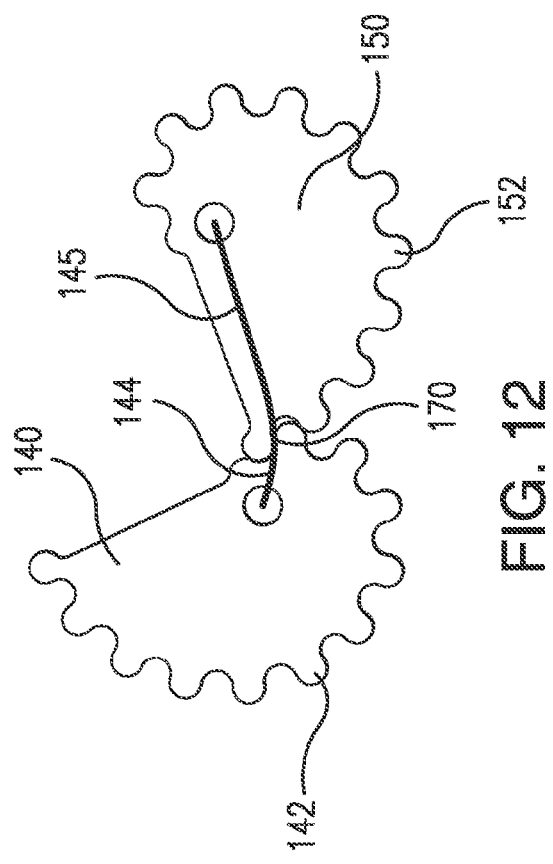
FIG. 12 is a top view of a second embodiment of a drive train in the fired position, showing just the first quarter pinion gear and the second quarter pinion gear for clarity.

A second embodiment of the present invention is depicted, for example, in FIGS. 12 and 13. For the sake of simplicity, FIGS. 12 and 13, like FIGS. 10 and 11, depict only the engagement between first quarter pinion 140 and second quarter pinion 150.

FIG. 12 shows an initial state of the drive device before the handle member 12 is moved from the unfired position to the fired position.

The first and second quarter pinions 140 and 150 are constructed as semi-circular disc elements and have teeth 142 and 152, respectively, distributed over the circumference. The two quarter pinions 140 and 150 engaged each other at engagement point 170.

In the initial state depicted in FIG. 12, a first spacing 144 between the axis of rotation of first quarter pinion 140 and the engagement point 170 is smaller than a second spacing 145 between the axis of rotation of second quarter pinion 150 and the engagement point 170.

FIG. 13 depicts first and second quarter pinions 140 and 150 after handle member 12 has been fired. In the position shown in FIG. 13, the first spacing 144 is larger than the second spacing 145.

In this way, the fulcrum of first quarter pinion 140 changes during the cycle of actuation of handle member 12. For example, the length of the first spacing 144 increases, starting from the state shown in FIG. 12 to the state shown in FIG. 13. Simultaneously, the fulcrum of second quarter pinion 150 also changes during the cycle of actuation of handle member 12. For example, the length of the second spacing 145 decreases, starting from the length shown in FIG. 12 and ending in the length depicted in FIG. 13.

The operation of depicted kitchen utensil 10 is as follows, and is described with respect to the first embodiment described above. It will be appreciated by those in the art that the description of the operation applies to the second embodiment described above as well.

Figure 9:
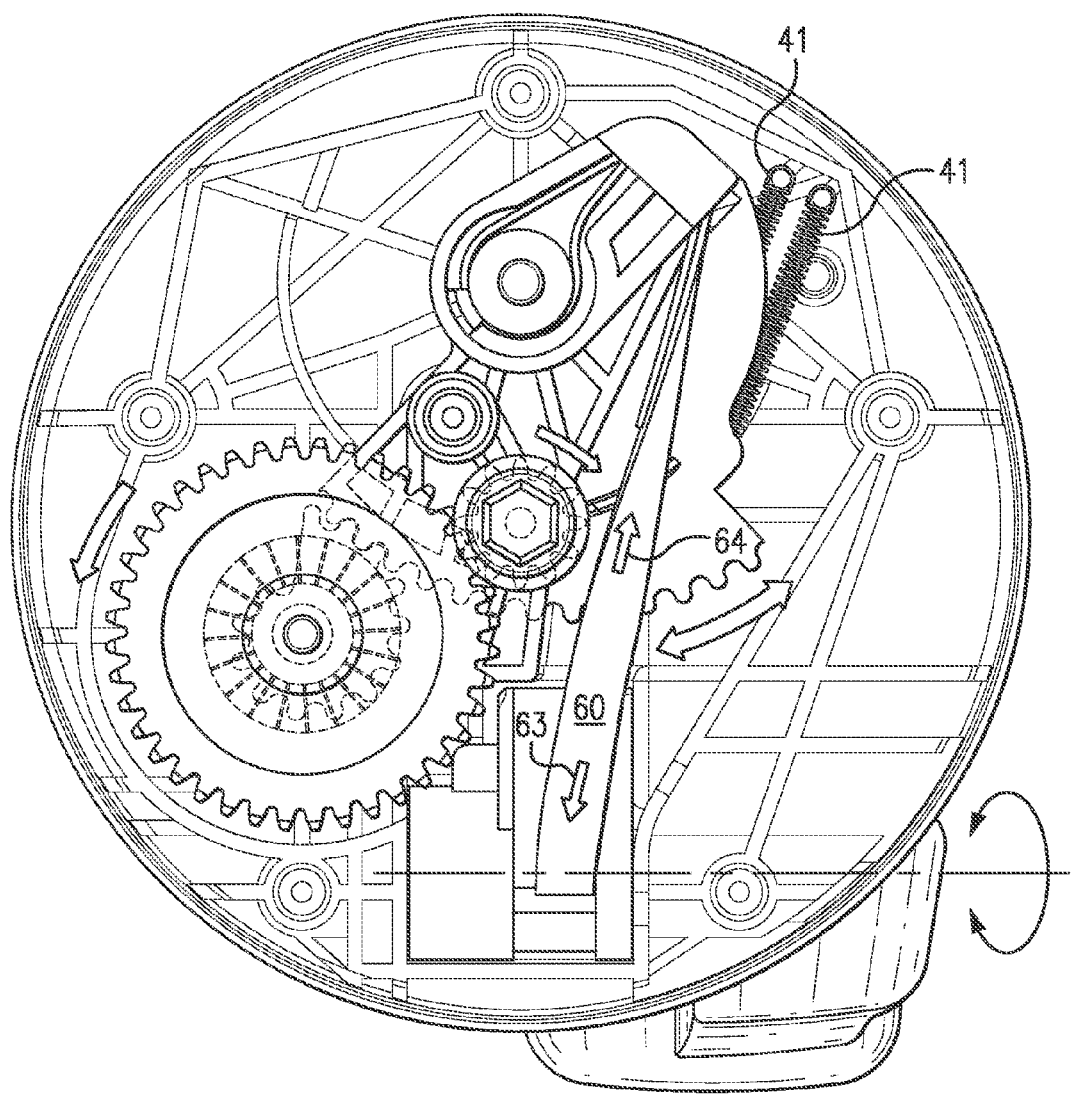
FIG. 9 is a bottom view of the assembled drive train of FIG. 2, with the drive train at the beginning of the cycle.

In storage, handle member 12 is locked in the down, fired position against lid 20, as depicted in FIG. 1. In this position, spring 72 is extended, and quarter pinion 40 and spiral radius gear 47 are at the end of their respective rotational cycles. When handle member 12 is unlocked, spring 72 biases quarter pinion 40 to the beginning of its rotational cycle, causing handle member 12 to rotate to near vertical with respect to lid 20, as depicted in FIG. 9. As a user rotates handle member 12 toward lid 20, spring 72 again becomes extended and flexible link 60 is pulled in a first lateral direction, depicted as arrow 63 in FIG. 9, causing quarter pinion 40 to begin its rotation cycle. Quarter pinion 40 rotates spiral radius gear 47. In this direction, the engagement means 80 transfers rotation from spiral radius gear 47 to spur gear 70, which then turns pinion 90, which turns processing implement 52 in one direction only.

After handle member reaches lid 20, the user releases handle member 12. Again, springs 41(*a*) and (*b*) bias quarter pinion 40 back to the beginning of the rotational cycle. This causes flexible link 60 to be pulled in the second lateral direction, depicted in FIG. 9, again causing handle member to rotate to the near vertical position depicted in FIG. 9. This also causes spiral radius gear 47 to rotate back to the beginning of its rotational cycle. However, because this rotation is in the opposite direction from that described above, engagement means 80 does not permit rotation to be transferred to spur gear 70. Thus, processing implement 52 is only rotated in one direction.

While specific configurations of the invention have been described in detail, it will be appreciated by those skilled in the art that various modifications and alternatives to those details could be developed in light of the overall teachings of this disclosure. The particular arrangements disclosed herein are meant to be illustrative only and not limited as to the scope of the invention which is to be given the full breadth of the appended claims and any equivalents thereof.

What is claimed is:

1. A drive unit for driving a food processing implement, the drive unit comprising:
   a handle member engaged to the drive unit and movable between an unfired position and a fired position;
   a first drive gear comprising a first axis of rotation and rotatable between a first position, which corresponds to the unfired position, and a second position, which corresponds to the fired position; and
   a second drive gear engaged to the first drive gear at a mesh point and comprising a second axis of rotation, the second drive gear rotatable between a first position, which corresponds to the unfired position, and a second position, which corresponds to the fired position;
   wherein the mesh point moves with respect to the axes of rotation of the drive gears as the handle member moves from the unfired position to the fired position such that the distance between the mesh point and the first axis of rotation is longer when the handle member is in the unfired position than it is when the handle member is in the fired position, and wherein the food processing implement is rotated by the drive unit as the handle member is moved from the first position to the second position.

2. The drive unit as set forth in claim 1, wherein the first drive gear is a spiral radius gear.

3. The drive unit as set forth in claim 2, wherein the second drive gear is a pinion quarter gear.

4. The drive unit as set forth in claim 2, further comprising a frame and at least one return spring engaged to the frame and the second drive gear, wherein the at least one return spring biases the second drive gear toward the first position.

5. The drive unit as set forth in claim 4, further comprising a first pinion gear engaged to the first drive gear, a second pinion gear engaged to the first pinion gear, and means for transferring rotation of the first drive gear to the first pinion gear only when the handle member moves from the unfired position to the fired position.

6. The drive unit as set forth in claim 5, wherein the food processing implement is engaged to the second pinion gear.

7. The drive unit as set forth in claim 6, further comprising a container engaged to the drive unit, wherein the food processing implement is positioned within the container and comprises a plurality of blades disposed around a central shaft.

8. A drive unit movable between a fired position and an unfired position to drive a food processing implement, the drive unit comprising:
   a frame;
   a base engaged to the frame and forming a cavity therebetween;
   a first drive gear disposed in the cavity and having a first axis of rotation;
   a handle member engaged to the first drive gear;
   at least one return spring engaged to the frame and the first drive gear, the at least one return spring biasing the first drive gear to the unfired position;
   a second drive gear disposed in the cavity and having a second axis of rotation, the second drive gear engaged to the first drive gear at a mesh point, wherein the distance between the mesh point and the first axis of rotation is longer when the handle member is in the fired position than it is when the handle member is in the unfired position; and
   a driven member disposed at least partially outside of the cavity and engaged to the food processing implement, wherein the driven member and the food processing implement are driven only when the drive unit is moved from the unfired position to the fired position.

9. The drive unit as set forth in claim 8, further comprising:
   a first pinion gear comprising a first gear form;
   a second gear form formed on the second drive gear; and
   a second pinion gear driven by the first pinion gear and engaged to the driven member;
   wherein the second gear form transfers rotation of the second drive gear to the first pinion gear through the first gear form only when the drive unit is moved from the unfired position to the fired position.

10. The drive unit as set forth in claim 9, further comprising an engagement spring engaged to the frame and the second drive gear, wherein the engagement spring biases the second drive gear toward the first pinion gear.

11. The drive unit as set forth in claim 8, wherein the first drive gear is a pinion quarter gear.

12. The drive unit as set forth in claim 8, wherein the second drive gear is a spiral radius gear.

13. The drive unit as set forth in claim 8, further comprising a lobe engaged to the frame and driven by the handle member.

14. The drive unit as set forth in claim 13, further comprising a flexible link engaged to the first drive gear and the lobe.

15. The drive unit as set forth in claim 14, wherein the flexible link comprises a first loop engaged to the lobe and a second loop engaged to the first drive gear.

16. The drive unit as set forth in claim 8, wherein the food processing implement comprises a plurality of blades disposed about a central shaft.

17. A drive unit for driving a food processing implement, the drive unit comprising:
- a lever rotatable between a first position and a second position;
- a pinion quarter gear comprising an axis of rotation and an arcuate gear form with a first end and a second end, wherein the distance between the axis of rotation and the first end of the arcuate gear form is longer than the distance between the axis of rotation and the second end of the arcuate gear form, and wherein the pinion quarter gear is engaged to the lever and rotatable between a first position, which corresponds to the first position of the lever, and a second position, which corresponds to the second position of the lever;
- a spiral radius gear engaged to the pinion quarter gear and disposed on a first pinion gear;
- means for selectively transferring rotation of the spiral radius gear to the first pinion gear; and
- a second pinion gear engaged to the first pinion gear, wherein the food processing implement is engaged to and driven by the second pinion gear;
- wherein rotation of the pinion quarter gear causes rotation of the spiral radius gear, and wherein the first end of the arcuate gear form is engaged to the spiral radius gear when the pinion quarter gear is in the first position, and the second end of the arcuate gear form is engaged to the spiral radius gear when the pinion quarter gear is in the second position.

18. The drive unit as set forth in claim 17, further comprising at least one return spring engaged to the pinion quarter gear, wherein the at least one return spring biases the pinion quarter gear to the second position.

19. A drive unit for driving a food processing implement, the drive unit comprising:
- a lever rotatable between a first position and a second position;
- a stepless gear mechanism driven by the lever, wherein the output speed of the stepless gear mechanism increases as the lever is rotated from the first position to the second position, and wherein the output torque of the stepless gear mechanism is decreased as the lever rotates from the first position to the second position;
- a first pinion gear engaged to the stepless gear mechanism;
- means for transferring speed and torque of the stepless gear mechanism to the first pinion gear only when the lever is rotated from the first position to the second position; and
- a second pinion gear engaged to the first pinion gear, wherein the food processing implement is engaged to and rotated by the second pinion gear as the lever is moved from the first position to the second position.

20. The drive unit as set forth in claim 19, wherein the stepless gear mechanism comprises a pinion quarter gear driven by the lever and rotatable between an un-fired position, which corresponds to the first position of the lever, and a fired position, which corresponds to the second position of the lever.

21. The drive unit as set forth in claim 20, further comprising a spiral radius gear engaged to the pinion quarter gear.

22. The drive unit as set forth in claim 20, further comprising at least one biasing spring engaged to the pinion quarter gear, wherein the at least one biasing spring biases the pinion quarter gear to the un-fired position.

23. The drive unit as set forth in 19, wherein the food processing implement comprises a plurality of blades disposed about a central shaft.

24. A food processing device, comprising:
- an upper housing having an outer surface and an inner surface;
- a lower housing engaged to the upper housing and forming a cavity therebetween;
- a container engaged to the lower housing;
- a lever comprising a first end, a second end opposite the first end and a lever body between the first end and the second end, wherein the lever is rotatable between a first position adjacent to the outer surface of the upper housing, and a second position, in which the lever is approximately perpendicular to the outer surface of the upper housing;
- a pinion quarter gear disposed in the cavity and having an axis of rotation, the pinion quarter gear comprising an arcuate gear form with a first end and a second end, wherein the distance between the axis of rotation and the first end of the arcuate gear form is longer than the distance between the axis of rotation and the second end of the arcuate gear form, and wherein the pinion quarter gear is engaged to the lever and rotatable between a first position, which corresponds to the first position of the lever, and a second position, which corresponds to the second position of the lever;
- a spiral radius gear rotatably disposed in the cavity;
- a first pinion gear disposed in the cavity;
- means for transferring rotation of the spiral radius gear to the first pinion gear only when the spiral radius gear is rotated in one direction;
- a second pinion gear engaged to the first pinion gear and at least partially disposed in the cavity, the second pinion gear comprising a protrusion that extends from the cavity through the lower housing; and
- a food processing implement driven by the second pinion gear and disposed in the container;
- wherein rotation of the pinion quarter gear causes rotation of the spiral radius gear, and wherein the first end of the arcuate gear form is engaged to the spiral radius gear when the pinion quarter gear is in the first position, and the second end of the arcuate gear form is engaged to the spiral radius gear when the pinion quarter gear is in the second position.

* * * * *

UNITED STATES PATENT AND TRADEMARK OFFICE
CERTIFICATE OF CORRECTION

| | | |
|---|---|---|
| PATENT NO. | : 8,695,490 B2 | Page 1 of 1 |
| APPLICATION NO. | : 13/075708 | |
| DATED | : April 15, 2014 | |
| INVENTOR(S) | : E. Mark Harris and Markus Klotz | |

It is certified that error appears in the above-identified patent and that said Letters Patent is hereby corrected as shown below:

Title Page, insert Item (30), Foreign Application Priority Claim:

-- April 1, 2010 (DE) .......... 102010016322.8-16
  May 26, 2010 (DE) ........... 10 2010 017 099.2 --

Signed and Sealed this
Twenty-third Day of September, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,695,490 B2  
APPLICATION NO. : 13/075708  
DATED : April 15, 2014  
INVENTOR(S) : E. Mark Harris and Markus Klotz It is certified that error appears in the above-identified patent and that said Letters Patent is hereby corrected as shown below:

On the Title Page, Item (73) Assignee, insert the following as an additional assignee.

-- Leifheit AG, Germany --

Signed and Sealed this  
Tenth Day of March, 2015

Michelle K. Lee  
*Deputy Director of the United States Patent and Trademark Office*